United States Patent [19]
Gansen, Jr.

[11] 3,860,704
[45] Jan. 14, 1975

[54] DRESSING FOR DRY TOOTH SOCKET

[76] Inventor: Adrian P. Gansen, Jr., 312 W. Green Bay St., Shawano, Wis. 54166

[22] Filed: Dec. 14, 1970

[21] Appl. No.: 98,072

Related U.S. Application Data

[63] Continuation of Ser. No. 870,527, Dec. 8, 1969, abandoned, which is a continuation of Ser. No. 738,785, June 21, 1968, abandoned, which is a continuation-in-part of Ser. No. 562,535, July 5, 1966, abandoned.

[52] U.S. Cl.................. 424/125, 424/195, 424/310, 424/357, 106/35
[51] Int. Cl............................................. A61k 5/00
[58] Field of Search..................................... 424/125

[56] References Cited
OTHER PUBLICATIONS

"Accepted Dental Remedies," 29th ed., published by American Dental Assoc., Chicago, 1964, pp. 24 and 116.
"The Dispensatory of the United States of America," 25th ed., published by J. B. Lippincott Co., Phila., 1955, pp. 734–736.
Massey, "Quarterly, National Dental Association," Vol. 18, pp. 5–14, Oct. 1950.
"Merck Index," 7th ed., published by Merck & Co., Inc., Rahway, N.J., 1960, pp. 118 and 210.

*Primary Examiner*—Richard L. Huff
*Attorney, Agent, or Firm*—Wheeler, Morsell, House & Wheeler

[57] ABSTRACT

The invention comprises a composition for relieving pain and promoting healing in the treatment of post extraction alveolitis, or dry socket, following tooth extraction. My formulation comprises procaine, charcoal, balsam of Peru, creosote, kaolin, and eugenol. It possesses the distinctive property of remaining plastic indefinitely after application and requires no irritating carriers, such as gauze. It also has the desirable characteristic of remaining in place until the tooth socket is covered by granulation tissue. As the tooth socket heals, my formulation disappears substantially to the same extent, until when healing is complete the compound of my invention has completely disappeared. My invention does not reside in the use of any particular ingredient, all of which were known for the same or similar uses, but in the formulation of all of the ingredients in such a manner as to create a soft plastic mass which is non-hardening.

3 Claims, No Drawings

DRESSING FOR DRY TOOTH SOCKET

RELATED APPLICATIONS

This application is a continuation of Ser. No. 870,527, filed Dec. 8, 1969, which is a continuation of Ser. No. 738,785, filed June 21, 1968, which is a continuation-in-part of Ser. No. 562,535, filed July 5, 1966, all now abandoned.

BACKGROUND OF THE INVENTION

Prior art formulations for the relief of pain and for the promotion of healing of dry tooth sockets were either compounded of ingredients which set into a hard mass, or required irritating carriers such as gauze. In the case of formulations which set hard, such as those containing zinc oxide, the mass would become uncomfortable, particularly since medication is not continuously released by such a compound, requiring the dentist to remove and replace the treatment compound every few days. Moreover, the compound could interfere with the formation of granulation tissue. The same considerations generally applied to gauze carriers. Examples of prior art formulations are found in the following U.S. Patents: 417,254; 1,420,634; 1,686,062; 1,721,334; and 1,866,433. Further examples are found in "ACCEPTED DENTAL REMEDIES." These disclose the use of my ingredients, but only in other formulations. They also disclose the effectiveness of my analgesic and antiseptic ingredients and the safety of those ingredients for use in dentistry. The prior art compounds were either of a nature to set hard, or were hard initially, or were liquids. These fail to give the beneficial results achieved by my non-setting, non-irritating compound, which disappears without need for removal yet remains in place for an adequate period to permit granulation of the socket.

DESCRIPTION OF THE INVENTION

My invention consists of a formulation used for the treatment of post extraction alveolitis or dry socket. My formulation is a plastic mass which may be packed in a tooth socket by the dentist, without the use of any irritating carrier such as gauze. When so packed it relieves pain substantially completely within fifteen to twenty minutes and continues to relieve pain for a long period, usually as long as the pack remains in place. There is no need to remove and replace the pack unless pain recurs. Otherwise, there is no need to remove the pack at any time, because it gradually disappears as healing progresses. This is believed to be due to the fact that my formulation remains plastic, as opposed to other formulations for the same purpose which are known to me. In particular, it is superior to those which employ zinc oxide, which set hard and ordinarily must be removed by the dentist, and those which employ gauze as a carrier. It is also superior to liquids, which have no long term effect. My formulation disappears only to the extent that granulation tissue formed during the healing of the tooth socket displaces the pack above the gum line. By the time healing is complete, the pack has disappeared.

My invention does not reside in the use of any single ingredient, all of which are known, but in the combination of ingredients. As an example, a suitable composition consists of the following ingredients:

| Ingredient | Percentage | Weight |
|---|---|---|
| Procaine | .5% to 10% | .6 to 12 grams |
| Charcoal | .5% to 12.5% | .6 to 15 grams |
| Balsam of Peru | .04% to 2.0% | 0.48 to 2.4 grams |
| Creosote | .366% to 1.0% | .440 to 1.2 grams |
| Kaolin | 98.6% to 74.5% | 118.32 to 89.4 grams |

The procaine, charcoal, balsam of Peru and creosote are combined with the kaolin to form a dry powder. The final composition is formed by mixing the dry powder with Eugenol to form a putty-like paste which can then be applied to a dry socket. A good paste has been formed when 10 minims of Eugenol is mixed with up to one gram of the dry powder. The amount of dry powder may vary, however, depending on the consistency of the composition desired by the user, from one gram to one-half gram for each 10 minims of Eugenol. Within this range each ingredient, except the kaolin carrier, is dentally effective without being excessive, and the consistency which distinguishes the invention is attained upon mixing the Eugenol with the dry powder. The procaine serves as an analgesic, and Eugenol is an antiseptic and anodyne. Charcoal is a deodorant, absorbent, and disinfectant. Koalin is an astringent and also serves as the principal carrier for the other ingredients. When mixed with the indicated ingredients, I have discovered that the initial stiff putty-like paste does not set into a rigid mass, but remains soft.

Specifically, the preferred form of my composition consists of:

| AMOUNT | | INGREDIENTS |
|---|---|---|
| 1.2 grams | | Procaine |
| 1.2 grams | | Charcoal |
| .048 grams | | Balsam or Peru |
| .440 grams | | Creosote |
| 117.112 grams | | Kaolin |
| 120.0 grams | (powder mix) | |

Mix 1 gram of the above powder with 10 minims of Eugenol to make a stiff putty-like paste, when treatment is to be made. These amounts need not be exact but represent a preferred form of my composition.

More specifically, the composition should have a consistency sufficient to remain in the stiff putty-like paste condition without becoming rigid. The following tests of the composition are representative of the consistency characteristic required for the composition of my invention. The tests were made on a free-standing mass formed into cylindrical columns 7.5 millimeters in diameter by 15 millimeters in height, using the minimum dry powder to liquid ratio for a first series of tests and a maximum dry powder to liquid ratio for a second series of tests. The mixtures of the composition tested were first, 0.45 grams of powder mix to 10 minims of liquid (Eugenol) and second (which is also the optimum) 1 gram powder mix to 10 minims of liquid (Eugenol). For the first composition with minimum powder (0.45 grams)-maximum liquid (10 minims) composition, the column stood unsupported without weight on a flat surface and showed no change in dimensions in two hours. The same mixture was then tested with a 10 gram weight placed on top of the column, and after two hours the column dimensions changed to 8.4 millimeters in diameter by 14 millimeters in height. Under the same conditions, but using the second composition having the maximum powder (1 gram)-maximum liquid (10 minims) ratio, the column showed no change after two hours without any weight on the column. With a 10 gram weight on the column this mixture reached dimensions of 7.8 millimeters in diameter by 14.5 millimeters in height with the 10 gram weight after two hours.

A second test was performed on a mass of the composition to determine the consistency by dropping a pointed plunger onto the mass and measuring the depth of penetration. The plunger had a 90° point and a weight of 49.03 grams and was dropped from a height of 75 millimeters. The depth of penetration of the point was recorded after each test. The compositions tested had the same powder to liquid ratio as above with the mass for all of the tests being 10 millimeters thick by 20 millimeters in diameter. Three tests were made on the composition formed with a ratio of 0.45 grams powder to 10 minims liquid and the average depth of penetration was five millimeters. In the three tests conducted on a composition formed with a ratio of 1 gram powder to 10 minims liquid, the average depth of penetration was 2.67 millimeters.

As used herein, a stiff putty-like paste is one which is not substantially beyond the powder to liquid ratios specified above, and which gives similar test results to those reported herein.

I claim:

1. A dental treatment composition consisting solely of the following ingredients in the following proportions:

1.2 parts procaine, 1.2 parts charcoal, 0.048 parts balsam of Peru, 0.440 parts creosote, kaolin sufficient to make a total of 120 parts, together with 10 minims of eugenol per gram of the other ingredients; said composition being a stiff putty like paste.

2. A plastic, nonhardening dental treatment composition consisting of 0.5 to 10.0 percent of procaine, 0.5 to 12.5 percent of charcoal, 0.04 to 2.0 percent of balsam of Peru, 0.366 to 1.0 percent of creosote, 98.6 to 74.5 percent of kaolin, and a sufficient amount of eugenol so that the composition is a stiff putty-like paste.

3. A dental treatment composition according to claim 2 wherein the amount of eugenol is 10 minims per gram of the other ingredients.

* * * * *